US009223871B2

(12) United States Patent
Mallapragada Naga Surya (10) Patent No.: US 9,223,871 B2
(45) Date of Patent: Dec. 29, 2015

(54) SYSTEM AND METHOD FOR AUTOMATIC WRAPPER INDUCTION USING TARGET STRINGS

(71) Applicant: Homer TLC, Inc., Wilmington, DE (US)

(72) Inventor: Siva Kalyana Pavan Kumar Mallapragada Naga Surya, Atlanta, GA (US)

(73) Assignee: Homer TLC, Inc., Wilmington, DE (US)

( * ) Notice: Subject to any disclaimer, the term of this patent is extended or adjusted under 35 U.S.C. 154(b) by 0 days.

(21) Appl. No.: 13/837,961

(22) Filed: Mar. 15, 2013

(65) Prior Publication Data

US 2014/0136568 A1    May 15, 2014

Related U.S. Application Data

(60) Provisional application No. 61/726,165, filed on Nov. 14, 2012.

(51) Int. Cl.
*G06F 17/30* (2006.01)
(52) U.S. Cl.
CPC ................................ *G06F 17/30864* (2013.01)
(58) Field of Classification Search
CPC ............................................. G06F 17/30864
USPC ........................................................ 707/722
See application file for complete search history.

(56) References Cited

U.S. PATENT DOCUMENTS

| 6,085,186 | A  | * | 7/2000 | Christianson et al. ................. 1/1 |
| 6,606,625 | B1 | * | 8/2003 | Muslea et al. ......................... 1/1 |
| 7,519,621 | B2 |   | 4/2009 | Harik |
| 2011/0209048 | A1 |   | 8/2011 | Scott et al. |

OTHER PUBLICATIONS

Kushmerick, N.: "Wrapper Induction for Information Extraction", Ph.D. Dissertation, University of Washington, (1997), pp. 1-264.
Kushmerick, N. et al.: "Wrapper Induction for Information Extraction", Int. Joint Conf. AI., (2007), 7 pages.
Kushmerick, N. et al.: "The Wrapper Induction Environment", Proceedings on the Workshop on Software Tools for Developing Agents (AAAI), (1998), pp. 131-132.
Qu, H.: "Wrapper Induction: Construct wrappers automatically to extract information from web sources", CMPT 882 Presentation, (Mar. 28, 2001), 4 pages.

(Continued)

*Primary Examiner* — Cheryl Lewis
(74) *Attorney, Agent, or Firm* — Norton Rose Fulbright US LLP (57) ABSTRACT

Wrappers are induced for multiple domains where, for a given target string having relatively universal distribution across domains of interest, a first wrapper may be defined and trained for a particular domain. Target strings extracted from that domain may be used to search for documents in other domains. New wrappers may be learned for other domains also containing the target strings. Further, a first wrapper may be learned for a given domain using a limited amount of training data from that single domain. The first wrapper is then applied to all pages in the domain to extract the relevant information. A few of the new words extracted are then searched against the document collection to obtain a list of domains that contain the extracted words. The updated information may be used as training data to learn new wrappers on those domains.

26 Claims, 3 Drawing Sheets (56) References Cited

OTHER PUBLICATIONS

Examiner's Report dated Apr. 9, 2015, issued in corresponding Canadian Patent Application No. 2833356.

Non-Final Office Action dated Jan. 16, 2015, issued in related U.S. Appl. No. 13/837,644.
Response to Non-Final Office dated Jul. 16, 2015, filed in related U.S. Appl. No. 13/837,644.

* cited by examiner

SYSTEM AND METHOD FOR AUTOMATIC WRAPPER INDUCTION USING TARGET STRINGS

CROSS-REFERENCE TO RELATED APPLICATIONS

This application claims priority to U.S. Provisional Application Ser. No. 61/726,165, filed Nov. 14, 2012 and entitled "SYSTEM AND METHOD FOR AUTOMATIC WRAPPER INFECTION," which is hereby incorporated by reference in its entirety. This application is also related to co-pending, commonly assigned U.S. patent application Ser. No. 13/837,644, filed Mar. 15, 2013 and entitled "SYSTEM AND METHOD FOR AUTOMATIC WRAPPER INDUCTION BY APPLYING FILTERS," the disclosure of which is incorporated herein by reference in its entirety. A copy of U.S. patent application Ser. No. 13/837,644 is attached hereto as Appendix A.

BACKGROUND

In data mining, a wrapper refers to a program that extracts content of a particular information source and translates it into relational form. A wrapper is typically hand-coded to be specific to a particular information source. This process can be tedious and error-prone. Wrapper induction refers to a technique in which wrappers may be automatically constructed. This automated technique aims to build algorithms that can learn wrappers on partially-, semi-, or un-structured documents from a set of labeled training data. Examples of such documents may include web pages, which are formatted for human browsing, rather than for use by a program. Providing labeled training data for every domain, although easier than building wrappers, is still a tedious and time-consuming task, given the large number of web domains.

SUMMARY

An automatic wrapper induction system according to embodiments aims to reduce the load on the users by bootstrapping wrappers from a minimal amount of training data. This approach assumes there is a wrapper induction algorithm, and a search engine that can search over the documents for a particular word, number, string, code, or any desired piece of information or object (collectively referred to herein as "target strings"). Non-limiting example target strings may include product prices, product code, phone numbers, email addresses, names, etc.

According to some embodiments, for a given (pre-defined) target string having relatively universal distribution across domains of interest, a wrapper may be defined and trained for a particular domain. Target strings thus extracted from the domain may be used to search for documents from other domains. The term "document" is used herein in its general sense denoting any text document. A wrapper may be "learned" for domains that have documents containing those pre-defined target strings.

According to some embodiments, a wrapper is learned for a given domain using a limited amount of training data from that single domain. This wrapper is then applied to all the pages in the domain to extract the relevant information. A few of the new words extracted are then searched against the document collection to obtain a list of domains that contain these words. This is now used as the labeled training data to learn the wrappers on those domains. Newer target words are obtained by applying the learnt wrappers on all the pages in the given domain. This process is iterated until all the domains are covered.

A key assumption behind this approach is that the domains overlap in web pages containing the target or expression of interest. As long as there is an overlap, there is very minimal need for any manual effort in creating labeled training data. To be precise, consider a graph where the nodes are the domains, and edges are between the nodes that share at least a few pages with common target values. In this case, for every connected sub-graph of the domains, the user needs to provide labeled data for only one of the domains in the connected sub-graph, as opposed to every domain thereby greatly reducing the labeling efforts.

These, and other, aspects will be better appreciated and understood when considered in conjunction with the following description and the accompanying drawings. The following description, while indicating various embodiments and numerous specific details thereof, is given by way of illustration and not of limitation. Many substitutions, modifications, additions or rearrangements may be made within the scope of this disclosure, which includes all such substitutions, modifications, additions or rearrangements.

DESCRIPTION OF THE FIGURES

The drawings accompanying and forming part of this specification are included to depict certain aspects of various embodiments. A clearer impression of these embodiments, and of the components and operation of systems provided with them, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Various features and advantageous the present disclosure are explained more fully with reference to the nonlimiting embodiments that are illustrated in the accompanying drawings and detailed in the following description. Descriptions of well-known starting materials, processing techniques, components and equipment are omitted so as not to unnecessarily obscure the present disclosure. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

Before discussing specific embodiments, a brief overview of the context of the disclosure may be helpful. As described above, wrapper induction refers to a technique in which wrappers may be automatically constructed. This automated technique aims to build algorithms that can learn wrappers on partially-, semi-, or un-structured documents from a set of labeled training data. In this disclosure, the term "document" is used in its general sense denoting any text document. Those skilled in the art appreciate that an unstructured document does not conform to any particular formal structure of data models associated with relational databases or other forms of data tables. A partially-structured or semi-structured document also does not conform to any particular formal structure of data models associated with relational databases or other forms of data tables, but nonetheless contains tags, marks, or some kind of self-describing structure.

Embodiments of an automatic wrapper induction system and method disclosed herein can minimize the amount of training data needed to learn new wrappers. This can be achieved by bootstrapping the knowledge base and building wrappers based on the bootstrapped knowledge base, thereby reducing the load on the users.

In particular, some embodiments make use of data that take on values that are uniform across a number of domains. These can include but are not limited to, Universal Product Codes (UPC), Manufacturer Product Numbers (MPN), International Standard Book Numbers (ISBN), colors, product names, and other data that substantially uniquely describe a product and, for many online stores selling the product, does not change. Those skilled in the art will appreciate that many types of data can have values that are uniform across domains. Thus, some embodiments may make use of any loosely formatted (or syntactic) string that describes or is associated with anything of interest. Non-limiting examples of such a target string can include, but are not limited to, phone numbers, email addresses, names, addresses, etc.

Figure 1:
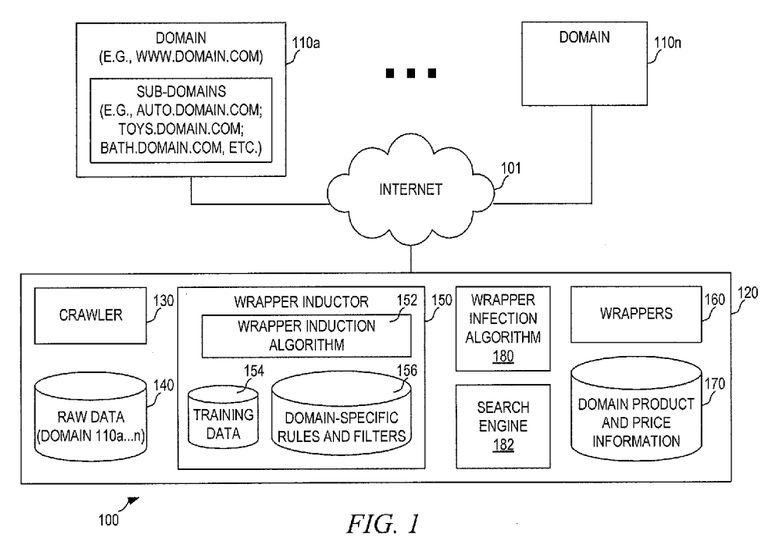
FIG. 1 depicts a block diagram of one embodiment of an architecture in which a wrapper induction system may be utilized.

Turning now to FIG. 1, a block diagram illustrating an exemplary system 100 for implementing wrapper induction in accordance with embodiments is shown. The wrapper induction system 120 couples to a network such as the Internet 101 and has access to domains 110a . . . 110n. The domains may be of the form www.domain.com and may include a plurality of sub-domains of the form abc.domain.com or wxy.domain.com, etc.

The wrapper induction system 120 may include a wrapper inductor 150 implementing a wrapper induction algorithm 152 and storing training data 154 and domain-specific rules and filters 156.

The wrapper induction system 120 may further include or be in communication with a crawler 130 operable to crawl the Internet for specific domains and store them in a raw data store 140. The training data 154 may include a predetermined number of web pages of a particular sub-domain from the raw data store 140.

Generated wrappers may be stored at 160 and the desired target information, such as product and price information obtained from applying the wrappers, may be stored at 170.

In addition, the wrapper induction system 120 may further include or implement a wrapper induction algorithm 180 and may further include or be in communication with a search engine 182 for searching the raw data store 140 (or the Internet 101) for particular terms in particular web pages.

In operation, the wrapper induction algorithm 180 receives or extracts target strings (or words) from an already-learned domain. A few of the new words extracted are then searched against the document collection to obtain a list of domains that contain these words. This is now used as the labeled training data to learn the wrappers on those domains. Newer target words are obtained by applying the learned wrappers on all the pages in the given domain. This process can be iterated, for instance, continuously, periodically, or until the search against the document collection produces no more domains and the automated wrapper induction is stopped.

Figure 2:
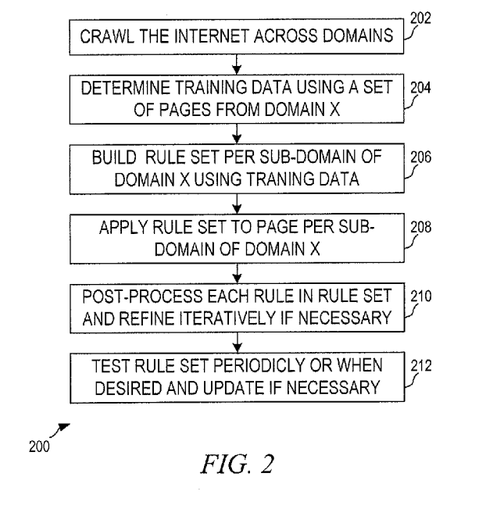
FIG. 2 depicts a flowchart illustrating operation of an induction process which may make use of wrapper induction according to embodiments.

Turning now to FIG. 2, a high level flowchart 200 illustrating operation of an induction process which may make use of wrapper induction according to embodiments is shown. Further details of an exemplary wrapper induction system and method may be obtained from the above-referenced commonly-assigned, co-pending U.S. patent application Ser. No. 13/837,644, entitled "SYSTEM AND METHOD FOR AUTOMATIC WRAPPER INDUCTION BY APPLYING FILTERS," which is hereby incorporated by reference in its entirety as if fully set forth herein. A copy of the co-pending application is included with this disclosure as Appendix A.

A web crawler 130 of the system 120 may crawl the Internet 101 across domains for data and store them in raw data sore 140 (step 202). In particular, in some embodiments, the raw data may comprise pages of sub-domains for large numbers of domains.

A predetermined set of training data 154 (such as a particular UPC for a particular product, etc.) are then defined using a set of pages (for example, 10 pages or less) from a targeted sub-domain of a particular domain (step 204). According to some embodiments, the training data are determined or received from a previously learned wrapper using the wrapper induction algorithm 180, as will be explained in greater detail below.

A set of rules based on the sub-domain are then developed using the training data (step 206). The set of rules may be based on one or more filter candidates and using a filter generator implemented by the wrapper induction algorithm 152.

The set of sub-domain specific rules are then applied to the training data (in this example, a set of pages from the sub-domain) (step 208). More specifically, the filters in each rule in the rule set are applied in sequence to each page in the training set of pages from the sub-domain. The outputs obtained may be post-processed depending on a given rule state and refined iteratively if necessary until a suitable rule set is obtained for each sub-domain (step 210). Once finalized, each rule set may be tested periodically or when desired, and updated if necessary (step 212).

Figure 3:
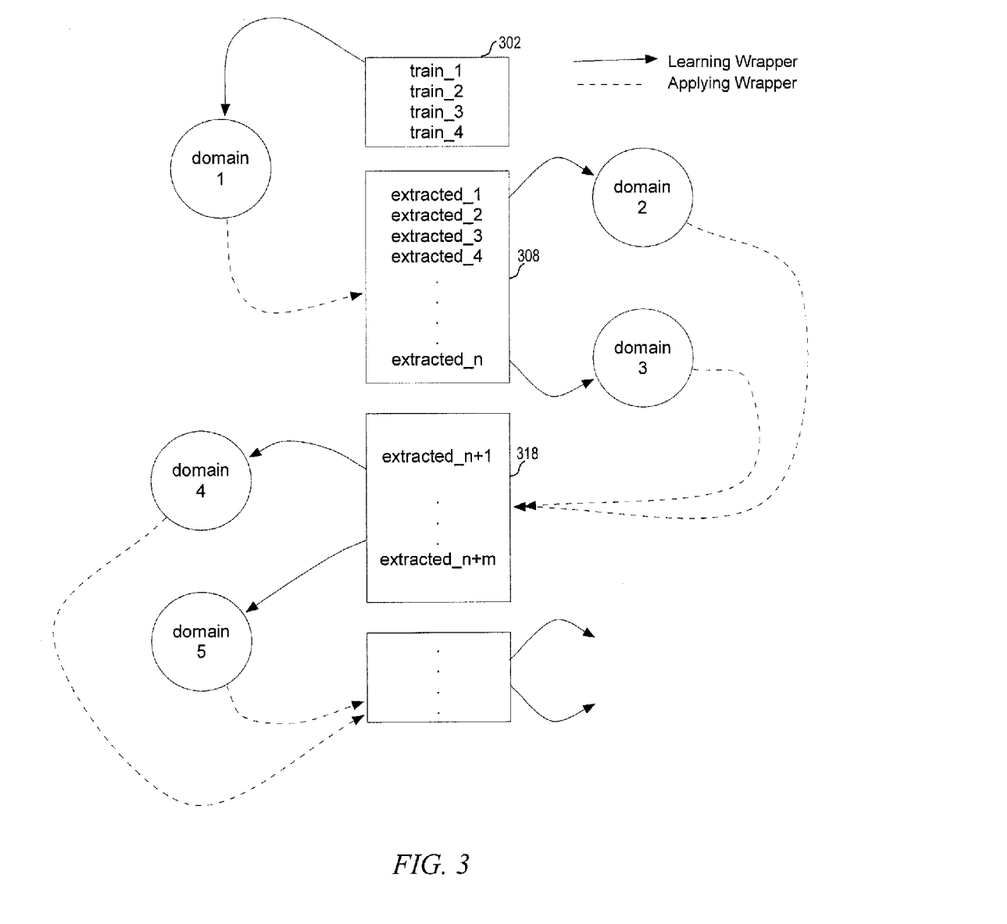
FIG. 3 schematically illustrates operation of an embodiment of a wrapper induction system.

Operation of embodiments of a wrapper induction system is illustrated schematically with reference to FIG. 3. Shown in FIG. 3 are example domains accessible on the Internet: domain 1, domain 2, domain 3, domain 4, domain, etc. In some embodiments, the domains 1-5 correspond to data stored in the raw data store 140. It is noted that embodiments are applicable to more or fewer than five domains; thus the figure is exemplary only. As noted above, the crawler may crawl, continuously or periodically, the Internet and store domain data in the raw data store 140. Domain data crawled from the Internet may include web pages, documents, images, various types of objects and files for a domain and its sub-domains, where available.

As shown at 302, one or more target strings that describe the content in a particular domain (e.g., domain 1) may be selected or defined. In some embodiments, wrapper induction can be applicable to strings that are known to be consistent, uniform, or constant across domains. For example, the Universal Product Code (UPC) is a specific type of barcode used in many countries in which each trade item is assigned a unique UPC. As such, it is possible to build a wrapper for a domain from a subset of pages (in the example of FIG. 3, four training documents train_1, train_2, train_3, train_4) crawled from that domain by labeling the UPCs in these pages. In some embodiments, wrapper induction can be applicable to strings that follow a known set of relatively minor variations across domains. For example, if the training data labeled a page with an MPN like AB12345, the wrapper induction algorithm 180 can look for target variations such as AB-12345 or AB-123-45/Z. In this example, the fact that additional hyphens or '/' may appear in various domains is known a priori and this knowledge is fed to the wrapper induction algorithm 180 along with the target string "AB12345."

Thus, at 302, the target training strings may be manually defined by a user, for example, by viewing each web page in the set of training pages and identifying and labeling the target training strings in the page. This process is referred to as wrapper learning. A wrapper, which is a function from a page to the set of tuples (each of which is an ordered list of elements) it contains, can then be produced/learned. The learned wrapper is applied to domain 1. As noted above, in this example, this first wrapper is learned from a subset of pages from domain 1. Once the wrapper corresponding to the domain 1 has been learned, it may be applied to the entire set of pages in domain 1 to extract all the desired target strings 308. As a specific example, if the desired targets were UPCs and four UPCs were used in the training phase, then n UPCs may be returned with the application of the wrapper to domain 1. Once the wrapper is built, domain 1 can be marked as "visited" in the data store 140.

At the behest of the wrapper induction algorithm 180, the search engine 182 may use the target strings 308 extracted from domain 1 to search the other domains stored in the raw data store 140 to find value-pairs that match the extracted target strings. In the example illustrated, domain 2 and domain 3 are found to contain a sufficient number of value-pairs that overlap with the extracted target strings. What constitutes a sufficient number may depend on a configurable threshold. As an example, since four UPCs were used to build a wrapper for domain 1, a domain having five or more tuples containing matching UPCs may be sufficient. Thus, in this example, domain 2 and domain 3 may contain at least five such tuples (HTML, target string) and thus are identified as the next candidates for the wrapper induction algorithm in which the newly discovered tuples are used to learn new wrappers for domain 2 and domain 3, as shown in FIG. 3.

At 318, the learned wrappers for domain 2 and domain 3 are applied to the stored raw data for domain 2 and domain 3 to extract new targets that can be used to identify the next candidate(s) for the wrapper induction algorithm. Once their wrappers are built, domain 2 and domain 3 can be marked as "visited" in the raw data store 140.

Figure 4:
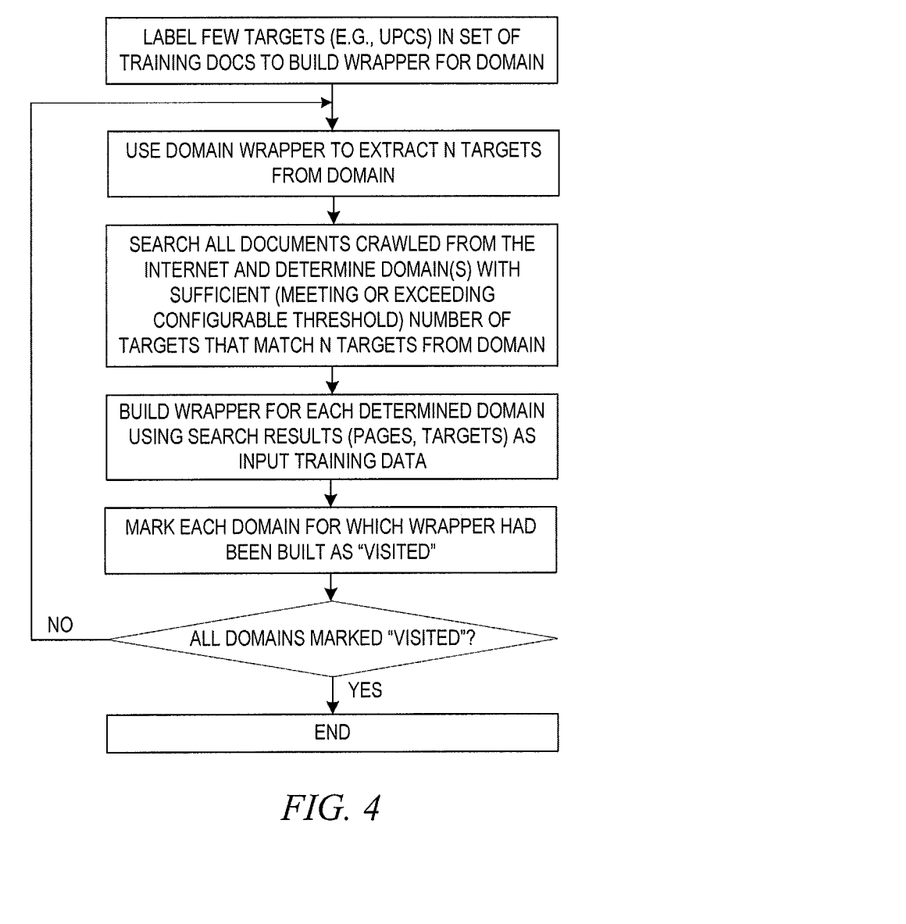
FIG. 4 depicts a flowchart illustrating operation of an embodiment of a wrapper induction system.

The process then continues: the search engine 182 searches the remaining domains in the raw data store for the extracted targets 318; in the example shown, domain 4 and domain 5 are found to be the next candidates for the wrapper induction algorithm. The results are then used to learn the wrappers for domains 4 and 5, and the process continues until there are no more unvisited domains in the raw data store 140. An example of the above-described wrapper induction process is illustrated in FIG. 4. As noted above, the crawler 130 may continuously or periodically crawl the Internet and update the raw data store 140. Thus, in one embodiment, the above-described wrapper induction algorithm may be run when the raw data store 140 is updated. In one embodiment, the above-described wrapper induction algorithm may be run at a scheduled time.

Although the present disclosure has been described in terms of specific embodiments, these embodiments are merely illustrative, and not restrictive. The description herein of illustrated embodiments, including the description in the Abstract and Summary, is not intended to be exhaustive or to limit the disclosure to the precise forms disclosed herein (and in particular, the inclusion of any particular embodiment, feature or function within the Abstract or Summary is not intended to limit the scope of the disclosure to such embodiments, features or functions). Rather, the description is intended to describe illustrative embodiments, features and functions in order to provide a person of ordinary skill in the art context to understand the present disclosure without limiting same to any particularly described embodiment, feature or function, including any such embodiment feature or function described in the Abstract or Summary. While specific embodiments are described herein for illustrative purposes only, various equivalent modifications are possible within the spirit and scope of the invention, as those skilled in the relevant art will recognize and appreciate. As indicated, these modifications may be made in light of the foregoing description of illustrated embodiments and are to be included within the spirit and scope of the disclosure. Thus, various changes and substitutions are intended in the foregoing disclosures, and it will be appreciated that in some instances some features of embodiments will be employed without a corresponding use of other features without departing from the scope and spirit as set forth. Therefore, many modifications may be made to adapt a particular situation or material.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein.

In the description herein, numerous specific details are provided, such as examples of components and/or methods, to provide a thorough understanding of described embodiments. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments. A person of ordinary skill in the art will recognize that additional embodiments are readily understandable from the disclosure.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, touch pad, etc.), or the like.

ROM, RAM, and HD are computer memories for storing computer-executable instructions executable by the CPU or capable of being complied or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used, individually or in conjunction with another programming language, to implement the routines, methods or programs of embodiments described herein, including C, C++, Java, JavaScript, HTML, or any other programming or scripting language, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the described embodiments.

It is also within the spirit and scope of the disclosure to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. Various embodiments may be implemented by using software programming or code in one or more general purpose digital computers, by using application specific integrated circuits, programmable logic devices, field programmable gate arrays, optical, chemical, biological, quantum or nanoengineered systems, or components and mechanisms may be used. In general, the functions of various embodiments can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

The invention claimed is:

1. A method for automatically constructing wrappers across a plurality of domains, executed by a processor, the method comprising:
creating a first wrapper in a first domain in the plurality of domains using a first set of training data, the first set of training data created from a subset of documents in the first domain;
applying the first wrapper to each page in the first domain to extract additional training data;
combining the first set of training data with the additional training data to generate a first target string;
searching domains in the plurality of domains other than the first domain to determine if any domain in the plurality of domains other than the first domain comprises at least one document having at least one portion of the first target string; and
creating a second wrapper for at least one of the other domains in the plurality of domains from the first target string.

2. The method of claim 1, further comprising:
applying the second wrapper to each page in the at least one of the other domains in the plurality of domains to extract second additional training data;
combining the first training string with additional second training data to generate a second target string;
searching domains in the plurality of domains other than the at least one of the other domains to determine if any domain in the plurality of domains other than the at least one of the other domains comprises at least one document having at least one portion of the second target string; and
creating a third wrapper for at least another of the other domains in the plurality of domains from the second target string.

3. The method of claim 1, further comprising:
constructing a rule set from the subset of documents in the first domain;
wherein the applying the first wrapper to each page in the first domain to extract additional training data comprises applying the rule set to each page in the first domain.

4. The method of claim 3, further comprising:
testing the rule set to determine whether the rule set should be revised.

5. The method of claim 1, wherein the searching other domains in the plurality of domains to determine if any of the other domains comprises at least one document having at least one portion of the first target string comprises determining if any of the other domains comprises a number of value-pairs matching the first target string above a threshold.

6. The method of claim 1, further comprising:
removing each domain for which a wrapper is created from a set of search domains in the plurality of domains.

7. The method of claim 1, wherein the first target string follows a known set of variations across the plurality of domains.

8. A system for automatically constructing wrappers across a plurality of domains, the system comprising:
a memory; and
a processor coupled to the memory, the processor configured to:
create a first wrapper in a first domain using a first set of training data, the first set of training data created from a subset of documents in the first domain;
apply the first wrapper to each page in the first domain to extract additional training data;
combine the first set of training data with the additional training data to generate a first target string;
search other domains in the plurality of domains to determine if any of the other domains comprises documents having portions of the first target string; and
create a second wrapper for at least one of the other domains in the plurality of domains from the first target string.

9. The system of claim 8, wherein the processor is further configured to:
apply the second wrapper to each page in the at least other domain in the plurality of domains to extract second additional training data;
combine the first training string with the additional second training data to generate a second target string;
search other domains in the plurality of domains to determine if any of the other domains comprises portions of the second target string; and
create a third wrapper for at least another of the other domains in the plurality of domains from the second target string.

10. The system of claim 8, wherein the processor is further configured to:
construct a rule set from the subset of documents in the first domain; and
apply the rule set to each page in the first domain.

11. The system of claim 10, wherein the processor is further configured to:
test the rule set to determine whether the rule set should be revised.

12. The system of claim 8, wherein the processor is further configured to:
determine if any other domains comprises a number of value-pairs matching the first target string above a threshold.

13. The system of claim 8, wherein the processor is further configured to:
remove each domain for which a wrapper is created from a set of search domains.

14. The system of claim 8, wherein the first target string follows a known set of variations across the plurality of domains.

15. A method for automatically constructing wrappers across a plurality of domains, executed by a processor, the method comprising:
identifying a first target string that is consistent or near-consistent across the plurality of domains, each of the plurality of domains comprising one or more documents common to at least one other of the plurality of domains;

creating a first wrapper for a first domain from the first target string;
extracting additional target information based on the first target string from one or more documents in the first domain;
searching domains in the plurality of domains other than the first domain to determine if any of the other domains comprises at least one document having at least one portion of the additional target information; and
creating a second wrapper for at least one of the other domains in the plurality of domains based on the first target string and extracted additional target information.

16. The method of claim 15, further comprising:
extracting second additional target information from one or more documents in the at least one of the other domains;
searching domains in the plurality of domains other than the at least one of the other domains to determine if any domain in the plurality of domains other than the at least one of the other domains comprises at least one document having at least one portion of the second additional target information; and
creating a third wrapper for at least another of the other domains in the plurality of domains based on the second additional target information.

17. The method of claim 15, wherein searching domains in the plurality of domains other than the first domain to determine if any of the other domains comprises at least one document having at least one portion of the additional target information comprises determining if any other domains comprises a number of value-pairs matching the additional target information above a threshold.

18. The method of claim 15, wherein extracting additional target information from one or more documents in the first domain is performed by applying the first wrapper to the documents in the first domain.

19. The method of claim 15, further comprising removing each domain for which a wrapper is created from a set of search domains.

20. The method of claim 15, wherein the first target string follows a known set of variations across the plurality of domains.

21. A system for automatically constructing wrappers across a plurality of domains, the system comprising:
a memory; and
a processor coupled to the memory, the processor configured to:
identify a first target string that is consistent or near-consistent across a plurality of domains, each of the plurality of domains comprising one or more documents common to at least one other of the plurality of domains;
create a first wrapper for a first domain from the first target string;
extract additional target information based on the first target string from one or more documents in the first domain;
search domains in the plurality of domains other than the first domain to determine if any of the other domains comprises at least one document having at least one portion of the additional target information; and
create a second wrapper for at least one of the other domains in the plurality of domains based on the extracted additional target information.

22. The system of claim 21 wherein the processor is further configured to:
extract second additional target information from one or more documents in the at least one of the other domains;
search domains in the plurality of domains other than the at least one of the other domains to determine if any domain in the plurality of domains other than the at least one of the other domains comprises at least one document having at least one portion of the second additional target information; and
create a third wrapper for at least another of the other domains in the plurality of domains based on the second additional target information.

23. The system of claim 21, wherein the processor is further configured to:
determine if any other domains comprises a number of value-pairs matching the additional target information above a threshold.

24. The system of claim 21, wherein the processor is further configured to:
extract additional target information from one or more documents in the first domain by applying the first wrapper to the documents in the first domain.

25. The system of claim 21, wherein the processor is further configured to:
remove each domain for which a wrapper is created from a set of search domains.

26. The system of claim 21, wherein the first target string follows a known set of variations across the plurality of domains.

* * * * *